United States Patent [19]
Griffiths et al.

[11] Patent Number: 4,822,496
[45] Date of Patent: Apr. 18, 1989

[54] PROCESS FOR THE TREATMENT OF EFFLUENT CONTAINING CYANIDE AND TOXIC METALS, USING HYDROGEN PEROXIDE AND TRIMERCAPTOTRIAZINE

[75] Inventors: Andrew Griffiths, Ridgewood, N.J.; Roy Norcross, Norwalk, Conn.; Gerhard Scherer, Montvale, N.J.; Friedrich W. Merz, Nierstein; Stephen Gos, Hanau, both of Fed. Rep. of Germany

[73] Assignee: Degussa Aktiengesellschaft, Frankfurt, Fed. Rep. of Germany

[21] Appl. No.: 233,576

[22] Filed: Aug. 18, 1988

[51] Int. Cl.$^4$ ................................................ C02F 1/62
[52] U.S. Cl. ..................................... 210/721; 210/725; 210/729; 210/759; 210/763; 210/904; 210/912
[58] Field of Search ............... 210/721, 722, 725, 727, 210/729, 759, 763, 904, 912–914

[56] References Cited

U.S. PATENT DOCUMENTS

| | | | |
|---|---|---|---|
| 3,970,554 | 7/1976 | Fischer et al. | 210/759 X |
| 4,070,281 | 1/1978 | Tagashira et al. | 210/904 X |
| 4,260,493 | 4/1981 | Kretas et al. | 210/912 X |
| 4,417,987 | 11/1983 | Harrison | 210/759 |
| 4,500,324 | 2/1985 | Vuong | 210/725 X |
| 4,508,838 | 4/1985 | Buckl | 210/688 X |
| 4,737,289 | 4/1988 | Castaldi et al. | 210/904 X |
| 4,743,381 | 5/1988 | Bull | 210/759 |

*Primary Examiner*—Tom Wyse
*Attorney, Agent, or Firm*—Beveridge, DeGrandi & Weilacher

[57] ABSTRACT

A process for the treatment of aqueous effluent containing cyanide and toxic or heavy metals, wherein the effluent is contacted with a sufficient amount of hydrogen peroxide to oxidize at least a substantial portion of the cyanide in the effluent in the presence of sufficient trimercaptotriazine to react with a substantial portion of the metal present in said effluent, and precipitating said metal component.

12 Claims, No Drawings

PROCESS FOR THE TREATMENT OF EFFLUENT CONTAINING CYANIDE AND TOXIC METALS, USING HYDROGEN PEROXIDE AND TRIMERCAPTOTRIAZINE

BACKGROUND OF THE INVENTION

The present invention relates to a process for the detoxification of effluent obtained from a variety of industrial processes, using hydrogen peroxide and trimercaptotriazine.

Purification of waste waters and recovery of components thereof is of major importance in connection with protection of the environment. Effluents from a variety of industries, including electroplating, steel-hardening and mining operations, often contain cyanide in various forms together with toxic metals. The detoxification of cyanide and the recovery of the toxic metals, or their conversion into harmless forms, are of paramount importance before such waste waters are discharged, in order to avoid serious damage to the environment and adverse impact on public health and safety.

A number of methods have been developed over the years for the treatment of such effluents. One of the best of the known methods involves the oxidation of the cyanide contained in the waste water with hydrogen peroxide. As far as possible, heavy metals contained in such waste effluents are removed by precipitation as a part of the overall process. These methods have been used successfully on a commercial scale for a number of years and are known to have a number of advantages over the even older methods such as treatment with chlorine, because the excess hydrogen peroxide that is utilized decomposes to give only water and oxygen. In the older methods involving chlorine, undesirable salts are formed and introduced into the waste water. The utilization of hydrogen peroxide overcomes the disadvantages associated with methods which involve salt formation and the introduction of those salts into waste waters.

Of all the forms in which cyanide occurs in waste waters, hydrogen peroxide is capable of oxidizing free cyanide ions and certain of the complex metal cyanides, including the tetracyanozincate, tetracyanocadmate, dicyanocuprate (I), tricyanocuprate (I) and tetracyanocuprate (I) ions. Species which are not oxidized to a significant or sufficient extent by hydrogen peroxide alone include hexacyanoferrate (II), hexacyanoferrate (III) and hexacyanocobaltate (III). One species that is often difficult to oxidize is the tetracyanonickelate (II) ion.

It can therefore happen that treatment of a waste water with hydrogen peroxide alone does not result in complete detoxification, due to the presence of cyanide in a form which is not amenable to oxidation.

In the case of hexacyanoferrate (II) ions, it is possible to remove these by precipitation with copper (II) ions, and separate the resulting copper (II) hexacyanoferrate (II) from the waste water by settling or filtration. Nevertheless, waste waters are sometimes encountered which are very difficult to treat, owing to the presence of complex metal cyanides which are not amenable to oxidation.

One method of removing toxic metals from waste waters is to add a chemical substance that induces the formation of an insoluble metal compound. This compound then forms a precipitate which can be separated from the waste water by settling or filtration. After separation, the clean waste water can be discharged and the precipitate can be recovered for re-use or safe disposal. The simplest and most frequently-used chemical substance used to precipitate toxic metals from waste water is an alkali such as lime, which precipitates metals in the form of their hydroxides. However, this method fails when complexing agents are present in the waste water, which prevent the precipitation. Various agents have been proposed or are in use for the purpose of precipitating metals from waste water containing complexing agents. These include solutions of sodium sulfide or sodium hydrosulfide, salts and esters of dithiocarbamic acid, and trimercaptotriazine (TMT) in its free acid or trisodium forms. These agents are capable of precipitating some metals from waste waters containing weak complexing agents such as ammonia or chloride, but they are less effective at precipitating metals from solutions containing cyanide, owing to the great complexing power of the cyanide ion. Solutions containing both cyanide and heavy metals are usually treated by oxidation of the cyanide, as described above, but if metal cyanide complexes are present which cannot be oxidized, the metals stay in solution and resist precipitation.

One method of treating waste waters containing cyanide and metals has been described in U.S. Pat. No. 4,417,987, whereby hydrogen peroxide is used in the presence of a complexing agent such as ethylenediamino-tetra acetic acid. This method suffers from the considerable disadvantage that the toxic metal is not removed from the waste water, but remains held in solution by the complexing agent.

Trimercaptotriazine is one precipitating agent which is commercially available in the free acid form or as the trisodium salt. Its structure may be represented as follows:

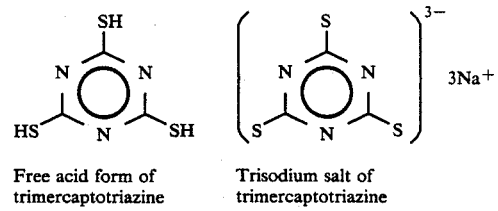

Free acid form of trimercaptotriazine

Trisodium salt of trimercaptotriazine

Trimercaptotriazine has a very low toxicity to fish, and the compounds it forms with heavy metals such as copper, nickel or mercury, are highly insoluble and highly stable. These properties make trimercaptotriazine more ecologically acceptable than other precipitating agents, such as sodium sulfide.

SUMMARY OF THE INVENTION

Accordingly, it is an object of the present invention to provide a method for the treatment of waste water containing cyanide and toxic metals, using hydrogen peroxide and trimercaptotriazine, which avoids the problems of conventional methods.

It has now been found that carrying out waste water treatment with hydrogen peroxide in the presence of trimercaptotriazine brings about a significant improvement in the detoxification of certain difficult-to-treat waste waters. This discovery is all the more surprising, since it is known that trimercaptotriazine is broken down by hydrogen peroxide into sulfur and other components. However, under the conditions of the present invention this does not affect the detoxification process negatively.

The effect of carrying out the oxidation of cyanide with hydrogen peroxide in the presence of trimercaptotriazine is that the removal of both cyanide and metals is improved significantly. The improvement is most notable if tetracyanonickelate (II) ions are present in the waste water.

DETAILED DESCRIPTION OF THE INVENTION

The present invention calls for the treatment of waste water or waste slurries containing cyanide and toxic metals, using hydrogen peroxide to oxidize the cyanide in the presence of trimercaptotriazine. The treatment process may be carried out as either a batch or a continuous process.

In the batchwise treatment of waste water by the present invention, the waste water is first allowed to flow, or is pumped, into a vessel fitted with some form or agitator, such as a propeller-type stirrer. Any type of vessel typically used in the treatment of waste water can be used for this purpose. The pH of the waste water is adjusted to between 9 and 12, preferably between 9.5 and 11.5, by addition of an alkaline material such as lime or sodium hydroxide.

Hydrogen peroxide is added to the waste water at a concentration of between 25 and 90%, preferably between 35 and 70% by weight, in a quantity sufficient to oxidize a substantial portion of the cyanide ion and any other oxidizable substances that may be present in the waste water. The effluent is normally at ambient temperature. The amount of $H_2O_2$ added must be at least equal to the mole ratio between $H_2O_2$ and the amount of cyanide to be removed, and may be as much as 5 times the mole ratio or even more, depending on the composition of the waste water and the degree of detoxification required.

Thus, equimolar, or excess, amounts $H_2O_2$ are used based on the cyanide present in the waste water. There is usually no need to heat the reactants, although the reaction is favored at somewhat elevated temperatures, e.g. 40°–50° C. Trimercaptotriazine is added in the form of a solution in water, preferably as a 15 percent by weight solution of the trisodium salt. The amount of trimercaptotriazine added depends on the composition of the waste water, particularly the concentrations of heavy metals. The dosage rate lies between 250 and 2500 ml of a 15% aqueous solution by weight of trisodium trimercaptotriazine per gram-mole of heavy metal ion. The amount of trimercaptotriazine added is sufficient to react with at least a substantial portion of the toxic or heavy metal present in the effluent. Preferably, the amount is sufficient to achieve complete reaction with the metal components present in the waste water. The trimercaptotriazine solution may be added before, during, or shortly after the addition of hydrogen peroxide to the waste water. The important point here is that the reaction of the hydrogen peroxide with the cyanide ions present in the waste water effluent must take place in the presence of the TMT.

The reaction may be accelerated by the addition of a catalyst, such as a copper (II) salt, especially copper (II) sulfate pentahydrate.

After completion of the reaction, which usually takes between 5 minutes and 2 hours, the waste water may be led to a sedimentation tank or thickener, where the precipitates are allowed to settle out. Such precipitates contain heavy or toxic metals, and may be filtered to remove as much water as possible, before removing them to a landfill or disposing of them in some other suitable way. The treated water is tested for residual cyanide and metals by methods known to those skilled in the art, and discharged or reused.

In the continuous-flow embodiment of the present invention, the waste water or waste slurry is allowed to flow, or pumped, through one or more treatment tanks, chosen in size and number to provide sufficient reaction time for the treatment process, which lies typically between 5 minutes and 2 hours. Each tank is provided with a means of agitation, such as a propeller-type stirrer. As many as four to six tanks can be used.

Provision is made for adjusting the pH in the first tank by addition of an alkaline material such as lime or sodium hydroxide, in order to maintain the pH between 9 and 12, preferably between 9.5 and 11.5. The addition of alkali metal may be controlled automatically, using a pH electrode and a controller, by methods well-known to those skilled in the art. Hydrogen peroxide is added to the first or second tank in the series in the form of an aqueous solution, of concentration between 25 and 90%, preferably between 35 and 70% by weight. The addition of hydrogen peroxide may be controlled manually, on the basis of regular analyses of the weak-acid dissociable cyanide concentration of the waste water or waste slurry, using methods well-known to those skilled in the art, or automatically using the method described in U.S. Pat. No. 4,416,786, whereby a continuous titration of a side-stream with a strong oxidizing agent is used to determine the demand of oxidizing agent.

An aqueous solution of trimercaptotriazine, preferably a 15% solution by weight of the trisodium salt, is added to the same tank to which the hydrogen peroxide is added. The rate of addition can be controlled manually on the basis of regular analyses of the waste water for dissolved metals, using methods known to those skilled in the art.

After the oxidation of cyanide has been completed, further steps may be carried out to further purify the effluent. Such steps include, but are not limited to, the addition of copper (II) salts to precipitate ferrocyanide ions, or iron (III) salts to precipitate arsenic, or the modification of pH by addition of acids or alkalis.

After treatment, the effluent may be allowed to flow under gravity or may be pumped to a pond, in which the solids separate out. The supernatant water may be discharged to the environment or reclaimed for use in the ore-processing operation.

The reaction between the oxidizing agent and the cyanide may be accelerated by the addition of a catalyst, such as soluble copper (II) salts, especially copper (II) sulfate pentahydrate.

The following examples serve to illustrate the present invention:

EXAMPLES

A sample of effluent was generated by leaching a Canadian gold ore with cyanide. After 36 hours of leaching with 0.5 g/liter sodium cyanide at a pH of 10.5 and a pulp density of 50%, the precious metals were removed with activated carbon and the slurry filtered to give a solution with the following composition:

| | |
|---|---|
| Total Cyanide (by distillation) | 182 mg CN/l |

| | -continued | |
|---|---|---|
| Weak acid dissociable cyanide (by the picric acid method) | 157 | mg CN/l |
| Free cyanide (by titration with silver nitrate solution) | 107 | mg CN/l |
| Copper (by atomi8c absorption spectroscopy) | 7.4 | mg/l |
| Nickel (by atomic absorption spectroscopy) | 13.7 | mg/l |
| Iron (by atomic absorption spectroscopy) | 21.8 | mg/l |

A series of detoxification tests were performed on 50 ml aliquots of this effluent and the resulting solution analyzed 15 minutes later for weak acid dissociable cyanide by the picric acid spectrophotometric method. 50 microliters of 20% copper sulfate pentahydrate solution in water was added to each aliquot to catalyze the reaction.

The results of four detoxification tests are shown in Table 1.

TABLE 1

| Example # | Microliters of 50% $H_2O_2$ added | Microliters of 15% TMT* added | pH | Residual cyanide concentration in mg CN/l |
|---|---|---|---|---|
| Example 1 | 327 | 0 | 10.0 | 20.5 |
| Example 2 | 643 | 0 | 9.9 | 7.8 |
| Example 3 | 327 | 50 | 10.0 | 1.5 |
| Example 4 | 327 | 50 | 8.8 | 0.2 |

*TMT = trisodium salt of trimercaptotriazine, solution in water.

It can be seen from Examples 3 and 4 that the addition of trimercaptotriazine results in significantly better detoxification, compared to the tests performed without trimercaptotriazine.

The results of detoxification tests carried out on samples of a waste water arising from a gold mining operation in Nevada are shown in Table 2. The waste water contained 258 mg weak acid-dissociable cyanide per liter before treatment. The same analytical techniques were used as for the previous examples. The detoxification tests were each performed on a 100.5 gram sample of this waste water.

TABLE 2
WASTE WATER FROM NEVADA

| Example # | Microliters of 50% $H_2O_2$ added | Microliters of 15% TMT* added | pH | Residual cyanide concentration in mg CN/l |
|---|---|---|---|---|
| Example 5 | 325 | 0 | 10.7 | 7.8 |
| Example 6 | 325 | 40 | 10.7 | <0.1 |

As can be seen from the above, the addition of trimercaptotriazine in accordance with the present invention results in a substantial improvement in the residual concentration of cyanide.

Further variations and modifications of the invention will be apparent from the foregoing and are intended to be encompassed by the appended claims.

We claim:

1. A process for the treatment of aqueous effluent containing cyanide and toxic or heavy metals, comprising contacting said effluent with a sufficient amount of hydrogen peroxide to oxidize at least a substantial portion of the cyanide in the effluent in the presence of sufficient trimercaptotriazine to react with a substantial portion of the metal present in said effluent, and precipitating said metal component.

2. The process according to claim 1 wherein the hydrogen peroxide has a concentration of between 25 to 90% by weight.

3. The process according to claim 1 wherein the hydrogen peroxide has a concentration of between 35 and 70% by weight.

4. The process according to claim 1 wherein the trimercaptotriazine is added in the form of a 15% aqueous solution.

5. The process according to claim 4 wherein the trimercaptotriazine is used in a dosage rate of 250 to 2500 ml per gram-mole of the toxic metal ion present in the effluent.

6. The process according to claim 1 further comprising adding an alkaline material to the effluent in a sufficient amount to adjust the pH to a value in the range of 9 to 12.

7. The process according to claim 6 wherein the pH is from 9.5 to 11.5.

8. The process according to claim 6 wherein the alkaline material is lime or sodium hydroxide.

9. The process according to claim 1 further comprising adding a catalyst to accelerate the reaction.

10. The process according to claim 9 wherein the catalyst is a copper (II) salt.

11. The process according to claim 10 wherein the catalyst is copper (II) sulphate pentahydrate.

12. The process according to claim 1 comprising conveying the effluent after reaction with hydrogen peroxide and trimercaptotriazine to a sedimentation or thickening zone and settling out of the precipitated metal.

* * * * *